(12) United States Patent
Park et al.

(10) Patent No.: US 8,349,969 B2
(45) Date of Patent: Jan. 8, 2013

(54) METHOD FOR PREPARING HIGH-PURITY POLYETHYLENEGLYCOL ALDEHYDE DERIVATIVES

(75) Inventors: Pyeong-uk Park, Gwangju (KR); Seong-Nyun Kim, Ulsan (KR); Woo-Hyuk Choi, Ulsan (KR); Hak-Sun Jang, Ulsan (KR); Gwan-Sun Lee, Seoul (KR); Se-Chang Kwon, Seoul (KR)

(73) Assignees: ID Biochem, Inc. (KR); Hanmi Holdings Co., Ltd. (KR)

( * ) Notice: Subject to any disclaimer, the term of this patent is extended or adjusted under 35 U.S.C. 154(b) by 283 days.

(21) Appl. No.: 12/993,336

(22) PCT Filed: May 19, 2009

(86) PCT No.: PCT/KR2009/002628
§ 371 (c)(1),
(2), (4) Date: Nov. 18, 2010

(87) PCT Pub. No.: WO2009/142423
PCT Pub. Date: Nov. 26, 2009

(65) Prior Publication Data
US 2011/0071262 A1    Mar. 24, 2011

(30) Foreign Application Priority Data
May 20, 2008    (KR) .................... 10-2008-0046802

(51) Int. Cl.
*C08F 283/06* (2006.01)
*C08G 65/332* (2006.01)
*C08G 65/333* (2006.01)
*C08G 65/334* (2006.01)

(52) U.S. Cl. ......... 525/404; 525/408; 525/409; 525/403

(58) Field of Classification Search .................. 525/404, 525/408, 409, 403
See application file for complete search history.

(56) References Cited

U.S. PATENT DOCUMENTS

| | | | | |
|---|---|---|---|---|
| 3,600,121 | A * | 8/1971 | Feldmann | 8/580 |
| 4,002,531 | A | 1/1977 | Royer | |
| 5,622,986 | A * | 4/1997 | Greenwald et al. | 514/449 |
| 5,990,237 | A | 11/1999 | Bentley | |
| 6,465,694 | B1 | 10/2002 | Baudys | |
| 6,586,001 | B1 * | 7/2003 | Zalipsky | 424/450 |
| 6,956,135 | B2 | 10/2005 | Rosen | |
| 7,812,051 | B2 * | 10/2010 | Ashwell et al. | 514/454 |
| 2005/0176896 | A1 * | 8/2005 | Bentley et al. | 525/409 |
| 2006/0100369 | A1 * | 5/2006 | Kao et al. | 525/54.1 |
| 2009/0324726 | A1 * | 12/2009 | Fernandes et al. | 424/489 |

FOREIGN PATENT DOCUMENTS

| | | |
|---|---|---|
| EP | 0372752 | 5/1993 |
| WO | 01/05873 | 1/2001 |
| WO | 2004/013205 | 2/2004 |

OTHER PUBLICATIONS

Samuel Zalipsky, Functionalized Poly(ethylene glycol) for Preparation of Biologically Relevant Conjugates, Bioconjugate Chem., 1005, 6, p. 150-165.
International Search Report—PCT/KR2009/002628 dated Jan. 4, 2010.
J. Milton Harris et al., "Synthesis and Characterization of Poly(ethylene Glycol) Derivatives," Journal of Polymer Science: Polymer Chemistry Edition, vol. 22, 1984, pp. 341-352.
Samuel Zalipsky, "Functionalized Poly(ethylene glycol) for Preparation of Biologically Relevant Conjugates," Bioconjugate Chem., vol. 6, No. 2, 1995, pp. 150-165.
Taiwanese Office Action—Taiwanese Application No. 098116696 issued on Aug. 28, 2012, citing Bioconjugate Chem., 1995, vol. 6, p. 150-165 and Polymer Science U.S.S.R., 1990, vol. 32, No. 5, p. 833-851.
I. N. Topchiyeva, Synthesis of Biologically Active Polyethylene Glycol Derivatives, Polymer Science U.S.S.R., 1990, vol. 32, No. 5, p. 833-840.
S. Zalipsky, Functionalized Poly(ethylene glycol) for Preparation of Biologically relevant Conjugates, Bioconjugate Chem., 1995, p. 150-157.

* cited by examiner

*Primary Examiner* — Randy Gulakowski
*Assistant Examiner* — Mike M Dollinger
(74) *Attorney, Agent, or Firm* — Cantor Colburn LLP

(57) ABSTRACT

A method for preparing high-purity polyethyleneglycol-alkylenealdehydes and derivatives thereof is provided.

8 Claims, No Drawings

METHOD FOR PREPARING HIGH-PURITY POLYETHYLENEGLYCOL ALDEHYDE DERIVATIVES

TECHNICAL FIELD

The present invention relates to a method for preparing high-purity polyethyleneglycol aldehyde derivatives.

BACKGROUND ART

Polyethyleneglycols (PEGs) are well known as representative hydrophilic polymers capable of forming hydrogen bonds with water molecules, along with natural polymers and synthetic polymers.

They are soluble in many organic solvents and are nearly nontoxic to humans. Since PEG is completely stretched in water, it may be conjugated with various medications (proteins, peptides, enzymes, genes, etc.) to reduce the toxicity of the medication molecules via steric hindrance and to protect the activity of the medication molecules from the immune system of the human body. Therefore, it may be applied for various medicines to slow clearance from the blood.

Further, when attached to medications having good medicinal effect but being highly toxic and having low solubility, the resultant PEG-drug has improved solubility and reduced toxicity.

In order to introduce PEG to drugs, various functional groups are attached at the end of the PEG chain.

PEG-propionaldehyde is used to increase solubility and efficiency of drugs by conjugation.

PEG-propionaldehyde and methoxy PEG-propionaldehyde (mPEG-propionaldehyde) may be obtained by oxidizing the terminal hydroxyl group of PEG or introducing an acetal group followed by hydrolysis. For example, U.S. Pat. No. 6,465,694 discloses a method for preparation of PEG-aldehyde derivatives, wherein oxygen gas is added to a mixture of PEG and a catalyst to oxidize the —$CH_2OH$ group to —CHO. However, the PEG chain may be decomposed under most oxidation conditions. And, the introduction of an acetal group at the end of the PEG chain is commercially inapplicable because the reactants are expensive.

Further, with regard to PEGylation, or the covalent attachment of PEG to a drug, U.S. Pat. No. 4,002,531 (Pierce Chemical Company) discloses a process of oxidizing mPEG (1 K) with $MnO_2$ to prepare mPEG acetaldehyde and attaching it to the enzyme trypsin (PEGylation) for use as a drug delivery system. However, this oxidation reaction may result in increased decomposition of the PEG chain. In addition, the conversion rate is not so high, with 80% or below.

In *J. Polym. Sci.* Ed, 1984, 22, pp 341-352, PEG-acetaldehyde was prepared from the reaction of PEG (3.4 K) with bromoacetaldehyde to prepare PEG-acetal, followed by hydrolysis. According to the paper, the degree of activation of aldehyde at the terminal group was about 65%, with the remaining ~35% remaining as unreacted hydroxyl groups. Thus, it may be inapplicable to a drug delivery system without further purification.

In U.S. Pat. No. 4,002,531 (The University of Alabama in Huntsville), the hydroxyl group at the end of the PEG chain is substituted with highly reactive thiol (—SH) group when PEG is reacted with a small molecule having an acetal group. Considering that PEG-OH has a low reactivity and it is difficult to react it with a single molecule by nucleophilic substitution, it is expected that the degree of activation will not largely different from that reported in *J. Polym. Sci. Ed*, 1984, 22, pp 341-352 (~65%).

U.S. Pat. No. 5,990,237 (Shearwater Polymers, Inc) presented a method of coupling PEG aldehydes to a variety of water soluble polymers (proteins, enzymes, polypeptides, drugs, dyes, nucleosides, oligonucleotides, lipids, phospholipids, liposomes, etc.) having amine groups, thereby preparing polymers stable in aqueous solution, without easily hydrolyzable groups, e.g. ester, in the polymer chain. However, the purity of PEG aldehydes given in the examples is variable (85-98%) depending on the reaction conditions.

WO 2004/013205 A1 (F. Hoffmann-La Roche AG) and U.S. Pat. No. 6,956,135 B2 (Sun Bio, Inc) presented substances having an aldehyde group at the terminus of the PEG chain but containing carbonyl groups or nitrogens within the PEG chain. They may exhibit different properties from the substances having a PEG chain consisting only of oxygen and hydrogen. Further, since the terminal functional group of the PEG chain is converted without intermediate purification processes, there is a high risk of byproduct (unreacted PEG) generation.

DISCLOSURE OF INVENTION

Technical Problem

An object of the present invention is to provide a method for preparing polyethyleneglycol (PEG) aldehyde derivatives capable of converting the hydroxyl group of PEG or derivatives one of the alcohol groups at the end of the PEG chain of which is substituted with alkoxy (hereinafter, alkoxy-PEG) to an aldehyde group.

More specifically, an object of the present invention is to provide a preparation method capable of economically preparing PEG aldehydes or alkoxy-PEG aldehydes from PEG or alkoxy-PEG such as mPEG, which are used to improve solubility and efficiency of drugs by attaching thereto, without impurities.

Technical Solution

The inventors of the present invention have found out that the production of low-molecular-weight PEG caused by the decomposition of the PEG chain can be minimized by oxidizing polyethyleneglycol (PEG) or alkoxy-PEG) under a mild condition (Pfitzner-Moffatt oxidation) to convert the terminal hydroxyl group to an aldehyde group, or by introducing a hydroxy(C3-C10)alkyl group at the terminus of PEG or alkoxy-PEG and then oxidizing it under a mild condition (Pfitzner-Moffatt oxidation) to convert the terminal hydroxyl group to an aldehyde group.

The preparation method in accordance with the present invention is deemed a commercially applicable economical method because the terminal alcohol group of macromolecules can be quantitatively converted into an aldehyde group without decomposition of the PEG chain, most of the reactants are commercially available substances, and the involved reaction does not require special preparation facilities (e.g. low temperature, high temperature, high pressure, etc.).

In a first embodiment, the present invention provides a method for preparing PEG aldehyde represented by Chemical Formula 1 by reacting a PEG derivative represented by Chemical Formula 2 with dimethyl sulfoxide and dicyclohexylcarbodiimide:

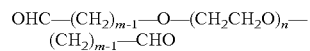   [Chemical Formula 1]

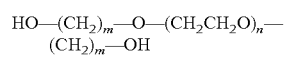   [Chemical Formula 2]

wherein n represents an integer from 3 to 2000; and m represents an integer from 2 to 10.

In a second embodiment, the present invention provides a method for preparing PEG aldehyde represented by Chemical Formula 10 by reacting a PEG derivative represented by Chemical Formula 11 with dimethyl sulfoxide and dicyclohexylcar-bodiimide:

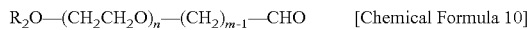  [Chemical Formula 10]

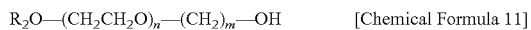  [Chemical Formula 11]

wherein n represents an integer from 3 to 2000;

m represents an integer from 2 to 10; and $R_2$ is selected from (C1-C7)alkyl or (C6-C20)ar(C1-C7)alkyl.

Hereinafter, the embodiments of the present invention will be described in detail.

Unless defined otherwise, all terms (including technical and scientific terms) used herein have the same meaning as commonly understood by one of ordinary skill in the art. In the description, details of well-known features and techniques may be omitted to avoid unnecessarily obscuring the presented embodiments.

The method for preparing PEG aldehyde according to the first embodiment of the present invention enables oxidation of the alcohol group of the compound represented by Chemical Formula 2 to aldehyde without decomposition of the PEG chain, thereby enabling preparation of PEG aldehyde represented by Chemical Formula 1 with high purity, with less impurities such as low-molecular weight PEG, PEG acid, etc. resulting from decomposition of the PEG chain:

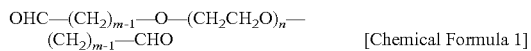  [Chemical Formula 1]

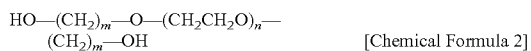  [Chemical Formula 2]

wherein n represents an integer from 3 to 2000; and m represents an integer from 2 to 10.

More specifically, the above reaction is performed by mixing the PEG derivative represented by Chemical Formula 2 with dimethyl sulfoxide, trifluoroacetic acid and pyridine and then adding dicyclohexylcarbodiimide. Optionally, following the reaction, the product may be crystallized using a heptanes-isopropyl alcohol mixture and recrystallized using an acetonitrile (AN)-methyl t-butyl ether (MTBE) mixture.

Of the method for preparing PEG aldehyde according to the first embodiment of the present invention, the method for preparing PEG aldehyde having a C3-C10 aldehyde group at the terminus of PEG specifically comprises: introducing a hydroxy(C3-C10)alkyl group at the terminus of PEG represented by Chemical Formula 3 to prepare a PEG derivative represented by Chemical Formula 4; and oxidizing the derivative represented by Chemical Formula 4 using dimethyl sulfoxide and dicyclo-hexylcarbodiimide to prepare PEG aldehyde represented by Chemical Formula 1:

  [Chemical Formula 3]

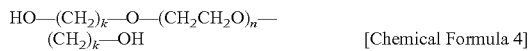  [Chemical Formula 4]

wherein n represents an integer from 3 to 2000; and k represents an integer from 3 to 10.

Specifically, the method for preparing the PEG derivative represented by Chemical Formula 4 comprises:

a) reacting PEG represented by Chemical Formula 3 with cyanoalkene represented by Chemical Formula 5 to prepare cyanoalkyl-PEG represented by Chemical Formula 6;

b) preparing PEG-carboxylic acid represented by Chemical Formula 7 from the cyanoalkyl-PEG represented by Chemical Formula 6;

c) reacting the PEG-carboxylic acid represented by Chemical Formula 7 with alcohol represented by Chemical Formula 8 to prepare a PEG-ester compound represented by Chemical Formula 9; and d) reducing the PEG-ester compound represented by Chemical Formula 9 to prepare the PEG derivative represented by Chemical Formula 4:

  [Chemical Formula 3]

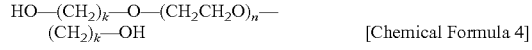  [Chemical Formula 4]

  [Chemical Formula 5]

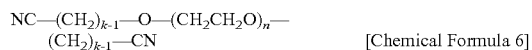  [Chemical Formula 6]

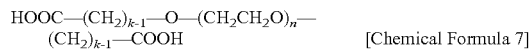  [Chemical Formula 7]

  [Chemical Formula 8]

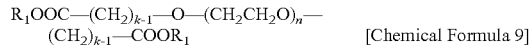  [Chemical Formula 9]

wherein n represents an integer from 3 to 2000;

k represents an integer from 3 to 10; and $R_1$ is selected from (C1-C7)alkyl or (C6-C20)ar(C1-C7)alkyl.

When preparing the PEG derivative represented by Chemical Formula 4, following one or more of the steps b) to d), a step of purifying the product by separating reaction byproduct, especially PEG and PEG acid, using an ion exchange resin column may be further included.

The method for preparing PEG aldehyde according to the second embodiment of the present invention enables oxidation of the alcohol group of the compound represented by Chemical Formula 11 to aldehyde without decomposition of the PEG chain, thereby enabling preparation of PEG aldehyde represented by Chemical Formula 10 with high purity, with less impurities such as low-molecular weight PEG, PEG acid, etc. resulting from decomposition of the PEG chain:

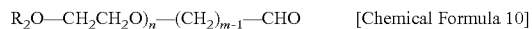  [Chemical Formula 10]

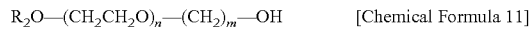  [Chemical Formula 11]

wherein n represents an integer from 3 to 2000;

m represents an integer from 2 to 10; and $R_2$ is selected from (C1-C7)alkyl or (C6-C20)ar(C1-C7)alkyl.

More specifically, in Chemical Formula 11, $R_2$ may be exemplified by methyl, ethyl, propyl, butyl and benzyl.

More specifically, the above reaction is performed by mixing the PEG derivative represented by Chemical Formula 11 with dimethyl sulfoxide, trifluoroacetic acid and pyridine and then adding dicyclohexylcarbodiimide. Optionally, following the reaction, the product may be crystallized using a heptanes-isopropyl alcohol mixture and recrystallized using an AN-MTBE mixture.

Of the method for preparing PEG aldehyde according to the second embodiment of the present invention, the method for preparing PEG aldehyde having a C3-C10 aldehyde group at the terminus of PEG specifically comprises: introducing a hydroxy(C3-C10)alkyl group at the terminus of alkoxy-PEG represented by Chemical Formula 12 to prepare an alkoxy-PEG derivative represented by Chemical Formula 13; and oxidizing the derivative represented by Chemical Formula 13 using dimethyl sulfoxide and dicyclohexylcarbodiimide to prepare PEG aldehyde represented by Chemical Formula 10:

  [Chemical Formula 12]

  [Chemical Formula 13]

wherein n represents an integer from 3 to 2000;

k represents an integer from 3 to 10; and $R_2$ is selected from (C1-C7)alkyl or (C6-C20)ar(C1-C7)alkyl.

More specifically, in Chemical Formulas 12 and 13, $R_2$ may be exemplified by methyl, ethyl, propyl, butyl and benzyl.

Specifically, the method for preparing the alkoxy-PEG derivative represented by Chemical Formula 13 comprises:

a) reacting alkoxy-PEG represented by Chemical Formula 12 with cyanoalkene represented by Chemical Formula 5 to prepare an alkoxy-PEG nitrile compound represented by Chemical Formula 14;

b) preparing alkoxy-PEG carboxylic acid represented by Chemical Formula 15 from the alkoxy-PEG nitrile compound represented by Chemical Formula 14;

c) reacting the alkoxy-PEG carboxylic acid represented by Chemical Formula 15 with alcohol represented by Chemical Formula 8 to prepare an alkoxy-PEG ester compound represented by Chemical Formula 16; and d) reducing the alkoxy-PEG ester compound represented by Chemical Formula 16 to prepare the PEG derivative represented by Chemical Formula 13:

  [Chemical Formula 12]

  [Chemical Formula 13]

  [Chemical Formula 5]
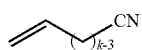

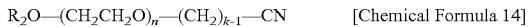  [Chemical Formula 14]

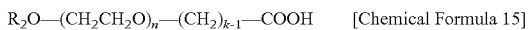  [Chemical Formula 15]

  [Chemical Formula 8]

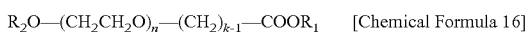  [Chemical Formula 16]

wherein n represents an integer from 3 to 2000;

k represents an integer from 3 to 10; and $R_1$ and $R_2$ are independently selected from (C1-C7)alkyl or (C6-C20)ar(C1-C7)alkyl.

More specifically, in Chemical Formulas 5, 8 and 12-16, $R_1$ and $R_2$ may be exemplified by methyl, ethyl, propyl, butyl and benzyl.

When preparing the PEG derivative represented by Chemical Formula 13, following one or more of the steps b) to d), a step of purifying the product by separating reaction byproduct, especially PEG and PEG acid, using an ion exchange resin column may be further included.

Advantageous Effects

In the present invention, polyethyleneglycol (PEG) aldehydes or alkoxy-PEG aldehydes are prepared from PEG or alkoxy-PEG through cyanation, hydrolysis, esterification, reduction and oxidation. Byproducts produced from hydrolysis and reduction, especially PEG and PEG acid, can be minimized by separation and purification using an ion exchange resin column. The terminal alcohol group of macromolecules can be quantitatively converted to an aldehyde group without decomposition of the PEG chain. The preparation method in accordance with the present invention is deemed a commercially applicable economical method because the reactants are commercially available substances and the involved reaction does not require special preparation facilities (e.g. low temperature, high temperature, high pressure, etc.).

MODE FOR THE INVENTION

The examples and experiments will now be described. The following examples and experiments are for illustrative purposes only and not intended to limit the scope of the present invention. Unless specified otherwise, % denotes mol %.

EXAMPLE 1

Preparation of PEG-propionaldehyde

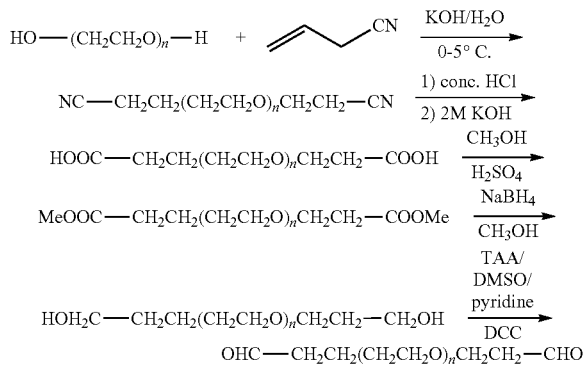

PEG-propionaldehyde was prepared according to the above reaction scheme. A detailed description of each step will be given below.

Cyanation

PEG (number average molecular weight=3.4 K, 100 g) is dissolved in distilled water (600 mL) in a reactor. KOH (45 g) is added and the mixture is cooled to 1-5 C. After the cooling, acrylonitrile (16 g) is added and the mixture is allowed to react for 3 days. Upon completion of the reaction, the mixture is extracted 3 times with MC (400 mL) and the solvent is completely removed.

Yield: 110 g $^{1}$H-NMR (200 MHz, CDCl$_3$): PEG backbone (m, 3.20-4.20 ppm), —OCH$_2$CH$_2$CN (t, 2.63 ppm)

Hydrolysis and Purification c-HCl (500 mL) is added to the concentrated residue (110 g) and the mixture is allowed to react at room temperature for 2 days. After extracting 3 times with MC (400 mL), MC is completely concentrated. 10% KOH solution (600 mL) is added to the concentrated residue (95 g) and the mixture is allowed to react at room temperature for 2 days. Upon completion of the reaction, the mixture is extracted 3 times with MC (300 mL) and the solvent layer is concentrated. Ethyl ether (1.2 L) is added and white powder (88 g) is obtained through crystallization at 0 C, filtration and drying. The dried white powder is purified using an ion exchange resin column.

Yield: 52 g (HPLC purity: 99.94%)

$^1$H-NMR (200 MHz, CDCl$_3$): PEG backbone (m, 3.20-4.20 ppm), —OCH$_2$CH$_2$C(O)OH (t, 2.60 ppm)

Esterification

MeOH (400 mL) and H$_2$SO$_4$ (2.25 g) are added to the purified PEG diacid (52 g) and the mixture is allowed to react at room temperature for 2 days. After MC extracting 3 times with MC (300 mL), the solvent layer is completely concentrated.

Yield: 51 g $^1$H-NMR (200 MHz, CDCl$_3$): PEG backbone (m, 3.20-4.20 ppm), —OCH$_3$ (s, 3.50 ppm) —OCH$_2$CH$_2$C(O)OCH$_3$ (t, 2.60 ppm)

Reduction and Purification

MC (30 mL) and MeOH (30 mL) are added to the concentrated residue (51 g). After stirring for 30 minutes, NaBH$_4$ (3 g) is added and the mixture is allowed to react for 24 hours. Upon completion of the reaction, most of the solvent is removed and, after adding 1 N—NaOH solution (400 mL), the mixture is stirred at an internal temperature of 80 C for 1 hour. After cooling, conc-HCl is added to adjust pH to 1.5-2 and the mixture is extracted 3 times with MC (200 mL). White powder (42 g) is obtained by crystallizing with methyl tert-butyl ether (MTBE, 600 mL), followed by filtration and drying. The dried white powder is purified using an ion exchange resin column.

Yield: 30 g (HPLC purity: 100%)

GPC: M$_n$ (3023), PDI (polydispersity index)=1.02

$^1$H-NMR (200 MHz, CDCl$_3$): PEG backbone (m, 3.20-4.20 ppm), —OCH$_2$CH$_2$CH$_2$OH (t, 2.62 ppm), —OCH$_2$CH$_2$CH$_2$OH (t, 1.83 ppm)

Oxidation

PEG propyl alcohol (42 g) is dissolved in MC (80 mL). After adding DMSO (94 mL), internal temperature is lowered to 0-5 C. After adding pyridine (3 g) and trifluoroacetic acid (TFA, 4 g), the mixture is stirred at the same temperature for 1 hour. After adding dicyclohexylcarbodiimide (DCC, 10 g), the mixture is allowed to react at room temperature for 24 hours. Upon completion of the reaction, precipitated dicyclohexylurea (DCU) is removed by filtration. Thereafter, previously prepared heptanesisopropyl alcohol (IPA) (7:3 vol %, 1088 mL) is added and solid product is obtained by cooling and crystallization. The solid is recrystallized using AN-MTBE (5:1) and dried.

Yield: 25 g (by NMR purity: 99.73%)

GPC (mPEG): M$_n$(3156), PDI=1.02

GPC: M$_n$(3010), PDI=1.02

$^1$H-NMR (500 MHz, CDCl$_3$): —C(O)H (s, 9.80 ppm), PEG backbone (m, 3.20-4.20 ppm), —OCH$_2$CH$_2$C(O)H (t, 2.60 ppm)

EXAMPLE 2

Preparation of mPEG-Propionaldehyde mPEG (number average molecular weight=20 K)-propionaldehyde was prepared from mPEG (number average molecular weight=20 K) in the same manner as Example 1.

Yield: 60% (from mPEG, by NMR purity: 99.73%)

$^1$H-NMR (500 MHz, CDCl$_3$): —C(O)H (s, 9.80 ppm), PEG backbone (m, 3.20-4.20 ppm), —OCH$_2$CH$_2$C(O)H (t, 2.60 ppm)

EXAMPLE 3

Preparation of mPEG-Acetaldehyde mPEG acetaldehyde was prepared from mPEG (number average molecular weight=5 K) through the same oxidation process as in Example 1. A detailed description will be given below.

mPEG (number average molecular weight=5 K, 50 g) is dissolved in MC (100 mL). DMSO (100 mL) is added and the internal temperature is lowered to 0-5 C. After adding pyridine (5 g) and trifluoroacetic acid (TFA) (7 g), the mixture is stirred at the same temperature for 1 hour. After adding dicyclohexylcarbodiimide (DCC) (15 g), the mixture is allowed to react at room temperature for 24 hours. Upon completion of the reaction, precipitated dicyclohexylurea (DCU) is removed by filtration. Thereafter, previously prepared heptanes-IPA (7:3 vol %, 1000 mL) is added and solid product is obtained by cooling and crystallization. The solid is recrystallized using AN-MTBE (5:1) and dried.

Yield: 95% (from mPEG, by NMR purity: 99.73%)

$^1$H-NMR (200 MHz, CDCl$_3$): —C(O)H (s, 9.67 ppm), PEG backbone (m, 3.20-4.20 ppm), —OCH$_2$C(O)H (s, 4.18 ppm)

The invention claimed is:

1. A method for preparing PEG aldehyde represented by Chemical Formula 1 by reacting a PEG derivative represented by Chemical Formula 4 with dimethyl sulfoxide and dicyclohexylcarbodiimide:

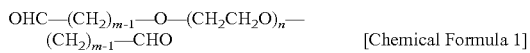
[Chemical Formula 1]

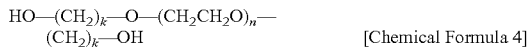
[Chemical Formula 4]

wherein n represents an integer from 3 to 2000; and k represents an integer from 3 to 10;

wherein the PEG derivative represented by Chemical Formula 4 is first prepared by a process comprising the steps of: reacting PEG represented by Chemical Formula 3 with cyanoalkene represented by Chemical Formula 5 to prepare cyanoalkyl-PEG represented by Chemical Formula 6;

preparing PEG-carboxylic acid represented by Chemical Formula 7 from the cyanoalkyl-PEG represented by Chemical Formula 6;

reacting the PEG-carboxylic acid represented by Chemical Formula 7 with alcohol represented by Chemical Formula 8 to prepare a PEG-ester compound represented by Chemical Formula 9; and reducing the PEG-ester compound represented by Chemical Formula 9 to prepare the PEG derivative represented by Chemical Formula 4:

$HO-(CH_2CH_2O)_n-H$  [Chemical Formula 3]

$HO-(CH_2)_k-O-(CH_2CH_2O)_n-(CH_2)_k-OH$  [Chemical Formula 4]

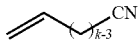  [Chemical Formula 5]

$NC-(CH_2)_{k-1}-O-(CH_2CH_2O)_n-(CH_2)_{k-1}-CN$  [Chemical Formula 6]

$HOOC-(CH_2)_{k-1}-O-(CH_2CH_2O)_n-(CH_2)_{k-1}-COOH$  [Chemical Formula 7]

$R_1-OH$  [Chemical Formula 8]

$R_1OOC-(CH_2)_{k-1}-O-(CH_2CH_2O)_n-(CH_2)_{k-1}-COOR_1$  [Chemical Formula 9]

$R_1$ is selected from (C1-C7)alkyl or (C6-C20)ar(C1-C7)alkyl.

2. The method for preparing PEG aldehyde according to claim 1, wherein the PEG derivative represented by Chemical Formula 2 is mixed with dimethyl sulfoxide, trifluoroacetic acid and pyridine, and dicyclohexylcarbodiimide is added thereto.

3. The method for preparing PEG aldehyde according to claim 1, wherein, following the reaction, crystallization is performed using a heptanes-isopropyl alcohol mixture and recrystallization is performed using an acetonitrile-methyl t-butyl ether mixture.

4. The method for preparing PEG aldehyde according to claim 1, further comprising, following one or more of said preparing the PEG-carboxylic acid represented by Chemical Formula 7 and said reducing the PEG-ester compound represented by Chemical Formula 9, separating reaction byproduct using an ion exchange resin column.

5. A method for preparing PEG aldehyde represented by Chemical Formula 10 by reacting a PEG derivative represented by Chemical Formula 13 with dimethyl sulfoxide and dicyclohexylcarbodiimide:

$R_2O-(CH_2CH_2O)_n-(CH_2)_{m-1}-CHO$  [Chemical Formula 10]

$R_2O-(CH_2CH_2O)_n-(CH_2)_k-OH$  [Chemical Formula 13]

wherein
 n represents an integer from 3 to 2000;
 k represents an integer from 3 to 10; and
 $R_2$ is selected from (C1-C7)alkyl or (C6-C20)ar(C1-C7)alkyl
 wherein the PEG derivative represented by Chemical Formula 13 is first prepared by a process comprising the steps of:

reacting alkoxy-PEG represented by Chemical Formula 12 with cyanoalkene represented by Chemical Formula 5 to prepare an alkoxy-PEG nitrile compound represented by Chemical Formula 14;

preparing alkoxy-PEG carboxylic acid represented by Chemical Formula 15 from the alkoxy-PEG nitrile compound represented by Chemical Formula 14;

reacting the alkoxy-PEG carboxylic acid represented by Chemical Formula 15 with alcohol represented by Chemical Formula 8 to prepare an alkoxy-PEG ester compound represented by Chemical Formula 16; and reducing the alkoxy-PEG ester compound represented by Chemical Formula 16 to prepare the PEG derivative represented by Chemical Formula 13:

$R_2O-(CH_2CH_2O)_n-H$  [Chemical Formula 12]

$R_2O-(CH_2CH_2O)_n-(CH_2)_k-OH$  [Chemical Formula 13]

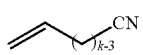  [Chemical Formula 5]

$R_2O-(CH_2CH_2O)_n-(CH_2)_{k-1}-CN$  [Chemical Formula 14]

$R_2O-(CH_2CH_2O)_n-(CH_2)_{k-1}-COOH$  [Chemical Formula 15]

$R_1-OH$  [Chemical Formula 8]

$R_2O-(CH_2CH_2O)_n-(CH_2)_{k-1}-COOR_1$  [Chemical Formula 16]

wherein
 n represents an integer from 3 to 2000;
 k represents an integer from 3 to 10; and
 $R_1$ and $R_2$ are independently selected from (C1-C7)alkyl or (C6-C20)ar(C1-C7)alkyl.

6. The method for preparing PEG aldehyde according to claim 5, wherein the PEG derivative represented by Chemical Formula 11 is mixed with dimethyl sulfoxide, trifluoroacetic acid and pyridine, and dicyclohexylcarbodiimide is added thereto.

7. The method for preparing PEG aldehyde according to claim 5, wherein, following the reaction, crystallization is performed using a heptanes-isopropyl alcohol mixture and recrystallization is performed using an acetonitrile-methyl t-butyl ether mixture.

8. The method for preparing PEG aldehyde according to claim 7, further comprising, following one or more of said preparing the alkoxy-PEG carboxylic acid represented by Chemical Formula 15 and said reducing the alkoxy-PEG ester compound represented by Chemical Formula 16, separating reaction byproduct using an ion exchange resin column.

\* \* \* \* \*